United States Patent
Busch et al.

(10) Patent No.: US 7,563,399 B2
(45) Date of Patent: Jul. 21, 2009

(54) BIAXIALLY ORIENTED FILM HAVING A LAYER CONSISTING OF ETHYLENE-VINYL-ALCOHOL COPOLYMER (EVOH)

(75) Inventors: Detlef Busch, Saarlouis (DE); Christian Peters, Ingbert (DE); Joachim Jung, Neunkirchen (DE)

(73) Assignee: Treofan Germany GmbH & Co. KG (DE)

( * ) Notice: Subject to any disclaimer, the term of this patent is extended or adjusted under 35 U.S.C. 154(b) by 448 days.

(21) Appl. No.: 10/536,377

(22) PCT Filed: Nov. 28, 2003

(86) PCT No.: PCT/EP03/13438

§ 371 (c)(1),
(2), (4) Date: May 26, 2005

(87) PCT Pub. No.: WO2004/050353

PCT Pub. Date: Jun. 17, 2004

(65) Prior Publication Data

US 2006/0172102 A1    Aug. 3, 2006

(30) Foreign Application Priority Data

Nov. 29, 2002   (DE) ................ 102 56 110

(51) Int. Cl.
*B29C 55/14* (2006.01)
*B29C 55/30* (2006.01)
*B29C 47/04* (2006.01)

(52) U.S. Cl. ............... 264/173.15; 264/210.6; 264/210.7; 264/211

(58) Field of Classification Search ............. None
See application file for complete search history.

(56) References Cited

U.S. PATENT DOCUMENTS

| 3,480,580 A | 11/1969 | Joyner et al. |
| 4,561,920 A | 12/1985 | Foster |
| 2003/0104125 A1 | 6/2003 | Busch et al. |

FOREIGN PATENT DOCUMENTS

| EP | 0311293 A | * | 9/1988 |
| EP | 0 758 675 | | 2/1997 |
| EP | 1 059 163 | | 12/2000 |
| WO | WO-01/85447 | | 11/2001 |

* cited by examiner

*Primary Examiner*—Monica A Huson
(74) *Attorney, Agent, or Firm*—Connolly Bove Lodge & Hutz LLP

(57) ABSTRACT

The invention relates to a method for manufacturing a multilayer biaxially oriented film which comprises at least five layers having the arrangement A/B/C/B/A, the inner layer C being synthesized from an ethylene-vinyl-alcohol copolymer (EVOH layer) and an adhesion promoting layer B made of modified polyolefin being applied on both sides on each surface of the EVOH layer C and a layer A made of a partially crystalline thermoplastic polyolefin being applied to the surfaces of the particular adhesion promoting layers, characterized in that the melts corresponding to the individual layers of the film are coextruded through a sheet die, the multilayer film thus obtained is drawn off on one or more roll(s) for solidification, the film is subsequently stretched in the longitudinal direction and then in the transverse direction using a tenter frame, the EVOH layer C and the adhesion promoting layers B and the layer A are coextruded at the same width, and the tenter hooks of the frame engage all five layers jointly and simultaneously during the transverse stretching. The invention also relates to a film, and a packaging made from the film.

15 Claims, No Drawings

BIAXIALLY ORIENTED FILM HAVING A LAYER CONSISTING OF ETHYLENE-VINYL-ALCOHOL COPOLYMER (EVOH)

RELATED APPLICATIONS

This application is a national stage application (under 35 U.S.C. 371) of PCT/EP2003/013438 filed Nov. 28, 2003 which claims benefit to German application 102 56 110.9 filed Nov. 29, 2002.

The present invention relates to a multilayer film having at least one internal layer made of an ethylene-vinyl-alcohol copolymer (EVOH).

Biaxially oriented polypropylene films are known in the related art. These films are used in greatly varying fields, such as food packaging, wrapping cigarettes, laminating film, and technical applications. The polypropylene film obtains many important usage properties through orientation in and perpendicular to the machine running direction, i.e., biaxial orientation. These boPP films are distinguished by, among other things, good transparency, high gloss, and a barrier to water vapor.

The barrier properties of the biaxially oriented polypropylene films to oxygen are in need of improvement, however. Therefore, for many applications, the films are coated in an additional processing step after manufacturing. Acrylate coatings, PVDC, PVOH, and other materials are used for this purpose. A further possibility is the metal coating of boPP films.

Combining the polypropylene layer with a further barrier layer is also frequently suggested. The selection of materials which may be combined with polypropylene is restricted, however. Therefore, until now only a few film composites have been successfully developed having barrier layers made of polymers which are different from polypropylene. For example, polyester layers, polyamide layers, or layers made of ethylene-vinyl-alcohol copolymer are used. These materials have completely different rheological properties than the typical polypropylenes, however, and therefore may not be stretched jointly without special measures. The adhesion of these layers to one another is also problematic. Solutions for these problems have already been suggested in the related art.

Thus, for example, a multilayer stretched polypropylene film having a layer made of ethylene-vinyl-alcohol (EVOH) copolymer is known. U.S. Pat. No. 4,561,920 describes a laminate made of an EVOH copolymer layer and a polymer adhesive layer on at least one surface of the EVOH layer and a polypropylene layer. The polymer adhesive layer is synthesized from polyolefin modified using maleic acid anhydride. According to this teaching, it is essential to the invention that the EVOH copolymer have a melt-flow index of at least 8 g/10 minutes (190° C. and 2.16 g), so that biaxial stretching of the composite is possible. Furthermore, according to the description, to achieve a good oxygen barrier, the biaxially stretched composite must be subjected to thermal fixing. For this purpose, the stretched film is finally guided over a row of heated rollers in order to encourage recrystallization of the EVOH and therefore improve the barrier values. It is specified that the oxygen barrier at 20° C. and 0% ambient humidity is approximately 12 $cm^3/m^2$*day.

EP 0758675 B1 describes a laminate made of an EVOH layer and a polypropylene film. The two layers are bonded to one another using an adhesive layer. The laminate may be produced using coextrusion, in which the layers made of EVOH, polypropylene, and adhesion promoter are coextruded jointly and simultaneously through a tubular die.

The oxygen barrier of these known films is also in need of improvement. Good oxygen barriers are particularly to be provided even in the event of elevated ambient humidity. Furthermore, it would be desirable to find a method which is more flexible in regard to the usable raw materials.

The object of the present invention is therefore to provide a film which may be manufactured on the typical stentering facilities via the process of sequential biaxial orientation and which has a favorable property profile. In this case, the good usage properties, such as gloss, transparency, etc., of the known biaxially oriented polypropylene films are to be maintained above all. In addition, good barrier properties in relation to oxygen and flavoring agents are especially desirable.

This object is achieved by a method for manufacturing a multilayer biaxially oriented film which comprises at least five layers having the arrangement A/B/C/B/A, the inner layer C being synthesized from an ethylene-vinyl-alcohol copolymer (EVOH) and an adhesion promoting layer B made of modified polyolefin being applied on both sides on each surface of the ethylene-vinyl-alcohol (EVOH) layer and a layer A made of a partially crystalline thermoplastic polymer being applied to the surfaces of the particular adhesion promoting layers, the melts corresponding to the individual layers of the film being coextruded through a sheet die, the multilayer film thus obtained being drawn off on one or more rollers for solidification, the film subsequently being stretched in the longitudinal direction and then in the transverse direction using a tenter frame, the ethylene-vinyl-alcohol copolymer layer C and the adhesion promoting layers B and the layers A being coextruded with the same width and the tenter hooks engaging all five layers jointly and simultaneously during the transverse stretching. The dependent subclaims specify preferred embodiments of the present invention.

In the scope of the present invention, it has been found that via the method according to the present invention, in which the tenter hooks engage the layers A, B, and C jointly, the transverse stretching forces are introduced into the film in such a way that a significantly better stretching of the EVOH layer together with the remaining layers of the coextruded composite is possible. It is suspected that the method results in a higher stretch-induced crystallization in the layers C and A, since all layers absorb the transverse stretching forces directly and the stretching forces are not only absorbed by the base layer and transmitted to the remaining layers, as in the free edge extrusion according to the related art. As a result, a better oxygen barrier is achieved than in comparable known constructions, without an additional thermal recrystallization being necessary. Simultaneously, layers whose rheological properties differ strongly may be stretched with one another via the method according to the present invention. Therefore, for example, it is even possible to use EVOH polymers having a MFI of less than 8 g/10 minutes for the internal EVOH layer without the known fisheye effect occurring. The method according to the present invention therefore has two decisive advantages. The films manufactured according to this method have a higher oxygen barrier and the materials for the individual layers may be sought out more flexibly, i.e., also taking other aspects, and not only stretchability, into consideration.

In the following, the composition and synthesis of the individual layers will be described.

Inner Layer C:

The inner layer C made of EVOH copolymer (referred to the following as the EVOH layer) contains at least 50 weight-percent, preferably 70 to 100 weight-percent, particularly 80 to <100 weight-percent, each in relation to the layer, of an ethylene-vinyl-alcohol (EVOH) copolymer described in the following. The layer C is referred to as the inner layer, since further layers are applied to both surfaces of the layer C.

EVOH copolymers are known per se in the related art and are manufactured through saponification or hydrolysis of ethylene-vinyl acetate copolymers. EVOH copolymers which have a degree of hydrolysis (degree of saponification) of 96 to 99% are particularly suitable. Furthermore, the ethylene content is to be in the range from 25-75 mole-percent, preferably in the range from 30-60 mole-percent, particularly in the range from 35-50 mole-percent. The melting point is generally in a range from 150 to 190° C. The melt-flow index at 190° and 2.16 g may be in the range from less than 8 g/10 minutes, preferably in the range from 1 to 7 g/10 minutes, particularly 2 to 6 g/10 minutes. Surprisingly, it is possible according to the method according to the present invention to stretch the film composite and achieve very good barrier values even if such an EVOH copolymer is used. In a further embodiment, the melt-flow index of the EVOH copolymer may even be higher, for example, ≧8 g/10 minutes, preferably 10 to 20 g/10 minutes.

The thickness of the EVOH layer is generally 1 to 10 µm, preferably 2 to 8 µm, particularly 3 to 6 µm. It has been found that the adhesive strengths of the layers on one another are also critically dependent on the thickness of the EVOH layer. It is especially advantageous not to exceed this thickness of 10 µm. With layers which are too thick, delamination of the coextruded layers occurs even after the extrusion on the cooling roller—depending on the EVOH selected. Stretching of this layered construction is then no longer possible. Surprisingly, it is possible according to the method according to the present invention to stretch the film sequentially using comparatively high stretching factors, even if the layer thickness of the EVOH layer is over 2 µm.

Adhesion Promoting Layer B:

It is essential according to the present invention that the layer A and the EVOH layer C are bonded to one another via an adhesion promoting layer B. The adhesive layer is therefore applied between the inner ethylene-vinyl-alcohol (EVOH) layer and the layer made of partially crystalline polyolefin A (strength layer), i.e., it is applied on each surface of the ethylene-vinyl-alcohol (EVOH) layer. The adhesive layer B ensures that the ethylene-vinyl-alcohol (EVOH) layer C and the layer A are bonded so solidly to one another that both layers C and A are stretched jointly when they are engaged simultaneously and jointly by the tenter hooks in the tenter frame, and the ethylene-vinyl-alcohol (EVOH) layer is oriented in such a way that the adhesion of the individual layers to one another is maintained. The adhesive layer is synthesized from modified polyolefins. In general, the adhesive layer contains at least 90 weight-percent, preferably 95 to 100 weight-percent, particularly 99 to <100 weight-percent of the modified polyolefin, in relation to the weight of the adhesive layer in each case.

The modified polyolefins are based on ethylene polymers or propylene polymers, of which propylene homopolymers, propylene copolymers, and propylene terpolymers are preferred. Propylene copolymers or terpolymers predominantly contain propylene units, preferably at least 80-98 weight-percent, and ethylene and/or butylene units in appropriate quantities as comonomers. These polymers are preferably modified using maleic acid anhydride, possibly also using other carboxylic acid units or their esters, such as acrylic acid or its derivatives.

Modified polypropylenes and polyolefins of this type are known per se in the related art and are sold, for example, by Mitsui Chemicals under the trade name Admer® or by Mitsubishi Chemicals under Modic® or by Chemplex under Plexar®, and as Epolene® by Eastman. The modified polypropylenes are manufactured from the unmodified polypropylenes and maleic acid anhydride by reacting maleic acid anhydride with polypropylenes of suitable viscosity at elevated temperatures. A method is described, for example, in U.S. Pat. No. 3,480,580. The modification is also referred to as a grafting reaction and the modified polypropylenes are correspondingly referred to as graft polymers, which are grafted with maleic acid anhydride.

For the purposes of the present invention, propylene homopolymers or propylene copolymers which are modified using maleic acid anhydride (e.g., Q series of Mitsui Chemicals), whose melt-flow index is in the range from 1 to 10 g/10 minutes at 230° C. (ASTM D 1238) and whose Vicat softening point is between 110 and 155° C., are preferred.

The thickness of the adhesive layer B is generally 0.4 to 4 µm, preferably 0.5 to 3 µm, particularly 0.8 to 2 µm.

Layer A:

For orientation of a film made of thermoplastic polymer, it is basically necessary for stretching forces introduced into the film via rollers or a stretching frame or other suitable means to act on all layers of the film in order to result in an orientation of each layer. It has been found in the scope of the present invention that a film construction which comprises both a polypropylene layer and an EVOH layer may be stretched in the longitudinal and transverse directions especially advantageously according to the method according to the present invention. As already explained, it is essential that in the transverse stretching all layers A, B, and C are engaged by the tenter hooks, through which direct absorption of the stretching forces by all layers A and C is provided.

According to the typical free edge method, the central base layer is extruded broader than the other layers, so that the tenter hooks do not also engage on the additional layers. Accordingly, in application on the film structure provided here, the tenter hooks would only engage the central layer made of EVOH, which must absorb the stretching forces alone and transmit them to the polypropylene layers. It has been shown that a film may also be manufactured according to this method if outstanding adhesion of the individual layers to one another is provided and if comparatively moderate stretching factors are applied. The selection of the main components for the individual layers is thus very restricted, for example, to the selection of an EVOH having an MFI of at least 8 g/10 minutes or an EVOH having an ethylene content of at least 40 mole-percent.

It has been shown from the above explanations that the layer C may also be selected from a significantly larger variety than in the methods known until now. The layer C must have a sufficiently large adhesive strength in relation to the adhesive layer B and be suitable for absorbing stretching forces, i.e., a partially crystalline polyolefin. Otherwise, it must only be ensured that the softening point is not too low in relationship to the transverse stretching temperature in the frame, so that adhesion of the tenter hooks to this layer C in the tenter frame is prevented. All materials which fulfill the requirements come into consideration in principle as the polyolefin for the layer C.

Partially crystalline polyolefins, whose crystallinity is at least 10 to 70%, preferably 30 to 70%, and whose melting point is at least 140° C. are suitable for the layer C. Preferably, a polymer whose ethylene content is between 0 and 5 weight-percent in relation to the polymer is used. Isotactic propylene homopolymers having a melting point from 150 to 170° C., preferably from 155 to 165° C., and a melt-flow index (measurement DIN 53 735 at 21.6 N load and 230° C.) from 1.0 to 15 g/10 minutes, preferably from 1.5 to 8 g/10 minutes, are especially suitable. The n-heptane soluble component of the isotactic propylene homopolymers is generally 1 to 10 weight-percent, preferably 2 to 5 weight-percent, in relation to the starting polymer. The crystallinity of the propylene homopolymers is preferably 40 to 70%, particularly 50 to 70%. The molecular weight distribution of the homopolymers may vary. The ratio of the weight average $M_w$ to the number average $M_n$ is generally between 1 and 15, preferably 2 to 10, very especially preferably 2 to 6. A narrow molecular weight distribution of the propylene homopolymers of this type is achieved, for example, by its peroxidic degradation or by manufacturing the polypropylene using suitable metallocene catalysts.

The layer thickness of the layer C is preferably 5 to 15 µm, more preferably 6 to 10 µm. It has been found that at layer thicknesses of below 5 µm, the stretching becomes more difficult and the composite may still only be biaxially oriented poorly. At layer thicknesses of above 15 µm, the overall thickness of the film is unfavorable, although for many applications the overall thickness of the film is not subject to any upper limit.

In a further embodiment, the layer C may be an opaque layer, as is provided in known opaque boPP films as the opaque base layer. In this embodiment, the layer C is opaque due to the addition of fillers. In general, the layer C in this embodiment contains at least 70 weight-percent, preferably 75 to 99 weight-percent, particularly 80 to 98 weight-percent, each in relation to the weight of the layer C, of one of the partially crystalline polyolefins and/or propylene polymers described above for the layer C, the propylene homopolymers described also being preferred.

The opaque C contains additional fillers in a quantity of at most 30 weight-percent, preferably 1 to 25 weight-percent, particularly 2 to 20 weight-percent, in relation to the weight of the layer C. According to the present invention, fillers are pigments and/or vacuole-initiating particles and are known per se in the related art.

Pigments are incompatible particles which essentially do not result in vacuole formation upon stretching of the film. The pigmenting effect of the pigments is caused by the particles themselves. "Pigments" generally have an average particle diameter of 0.01 to at most 1 µm, and comprise both "white pigments", which color the films white, and also "color pigments", which provide the film with a colored or black color. Typical pigments are materials such as aluminum oxide, aluminum sulfate, barium sulfate, calcium carbonate, magnesium carbonate, silicates such as aluminum silicate (kaolin clay) and magnesium silicate (talc), silicon dioxide, and titanium dioxide, of which white pigments such as calcium carbonate, silicon dioxide, titanium dioxide, and barium sulfate are preferably used.

"Vacuole-initiating fillers" are solid particles which are incompatible with the polymer matrix and lead to the formation of vacuole-like cavities when the film is stretched, the size, type, and number of the vacuoles being a function of the quantity and size of the solid particles and the stretching conditions such as the stretching ratio and stretching temperature. The vacuoles reduce the density and provide the film with a characteristic nacreous, opaque appearance, which arises due to light scattering at the boundaries "vacuole/polymer matrix". Typically, the vacuole-initiating fillers have a minimum size of 1 µm, in order to lead to an effective, i.e., opaque-making quantity of vacuoles. In general, the average particle diameter of the particles is 1 to 6 µm, preferably 1.5 to 5 µm.

Typical vacuole-initiating fillers are inorganic and/or organic materials which are incompatible with polypropylene, such as aluminum oxide, aluminum sulfate, barium sulfate, calcium carbonate, magnesium carbonate, silicates such as aluminum silicate (kaolin clay) and magnesium silicate (talcum) and silicon dioxide, of which calcium carbonate and silicon dioxide are preferably used. The typically used polymers which are incompatible with the polymers of the base layer come into consideration as organic fillers, particularly HDPE, copolymers of cyclic olefins such as norbornene or tetracyclododecene with ethylene or propene, polyesters, polystyrenes, polyamides, and halogenated organic polymers, with polyesters such as polybutylene terephthalate being preferred. "Incompatible materials and/or incompatible polymers" means, according to the present invention, that the material and/or the polymer exist in the film as separate particles and/or as a separate phase.

The opaque layer C generally contains pigments in a quantity from 0.5 to 10 weight-percent, preferably 1 to 8 weight-percent, particularly 1 to 5 weight-percent. Vacuole-initiating fillers are generally contained in a quantity from 0.5 to 30 weight-percent, preferably 1 to 15 weight-percent, particularly 1 to 10 weight-percent. The specifications relate to the weight of the layer C.

The density of the opaque layer C and therefore the film may vary depending on the composition of the opaque layer C in a range from 0.4 to 1.1 $g/cm^3$. In this case, vacuoles contribute to reducing the density, while in contrast pigments such as $TiO_2$ elevate the density of the opaque layer because of their higher specific weight. The density of the opaque layer in opaque embodiments is preferably 0.5 to 0.95 $g/cm^3$.

It has been found that even opaque layers, particularly even those having a vacuole-containing structure, are suitable as a layer for transmitting the stretching forces and therefore for manufacturing a stretched composite. The layer thickness of the opaque layer C is preferably in the range from 5 through 15 µm even for these embodiments.

In a preferred embodiment, the film according to the present invention has, in addition to the construction made of EVOH layer C, adhesive layers B, and layers C, at least one surface layer, preferably layers on both sides, which is/are applied to the surface(s) of the layers C. Six-layered and seven-layered film structures are thus implemented. These polyolefinic surface layers are then the external layers of the multilayer film construction and determine specific functionalities, such as sealability, gloss, friction, and other properties of the film, which are a function of the external layers. The surface layers are generally synthesized from polymers made of olefins having 2 to 10 carbon atoms. The surface layers generally contain 95 to 100 weight-percent polyolefin, preferably 98 to <100 weight-percent polyolefin, in relation to weight of the particular surface layer.

Examples of suitable olefinic polymers of the surface layers are polyethylenes, polypropylenes, polybutylenes, or mixed polymers made of olefins having two to eight C atoms, of which copolymers or terpolymers made of ethylene, propylene, and/or butylene units or mixtures of the polymers cited are preferred. These olefinic polymers preferably contain no functional groups and are synthesized solely from olefinic monomers. Preferred mixed polymers are random ethylene-propylene copolymers, preferably having an ethylene content of 1 to 10 weight-percent, particularly 2.5 to 8 weight-percent, or random propylene-butylene-1 copolymers, preferably having a butylene content of 2 to 25 weight-percent, more preferably 4 to 20 weight-percent, or random ethylene-propylene-butylene-1 terpolymers, preferably having an ethylene content of 1 to 10 weight-percent and a butylene-1 content of 2 to 20 weight-percent, or a mixture or a blend of ethylene-propylene-butylene-1 terpolymers and propylene-butylene-1 copolymers having an ethylene content of 0.1 to 7 weight-percent and a propylene content of 50 to 90 weight-percent and a butylene-1 content of 10 to 40 weight-percent.

The specifications in weight-percent each relate to the weight of the copolymers or terpolymers. The copolymers and/or terpolymers used in the surface layers described above, which are only synthesized from olefins, generally have a melt-flow index of 1.5 to 30 g/10 minutes, preferably of 3 to 15 g/10 minutes. The melting point is in the range from 120 to 140° C. The blend described above made of copolymers and terpolymers has a melt-flow index of 5 to 9 g/10 minutes and a melting point from 120 to 150° C. All melt-flow indices specified above were measured at 230° C. and a force of 21.6 N (DIN 53 735).

Suitable polyethylenes for the surface layers are HDPE, MDPE, and LDPE, as are typically used in biaxially oriented packaging films.

The thickness of the particular surface layer is generally greater than 0.1 μm and is preferably in the range from 0.5 to 10 μm, particularly 1 to 5 μm.

The surface layers and/or the layer C may contain additional typical additives such as neutralization agents, stabilizers, antistatic agents, antiblocking agents, and/or lubricants in effective quantities in each case. The following specifications in weight-percent each relate to the weight of the particular surface layer.

Suitable antiblocking agents are inorganic additives such as silicon dioxide, calcium carbonate, magnesium silicate, aluminum silicate, calcium phosphate, and the like, and/or incompatible organic polymers such as polyamides, polyesters, polycarbonates, and the like, or cross-linked polymers such as cross-linked polymethyl methacrylate or cross-linked silicone oils. Silicon dioxide and calcium carbonate are preferred. The average particle size is between 1 and 6 μm, particularly 2 and 5 μm. The effective quantity of antiblocking agent is in the range from 0.1 to 5 weight-percent, preferably 0.5 to 3 weight-percent, particularly 0.8 to 2 weight-percent.

Preferred antistatic agents are alkali-alkane sulfonates, polyether-modified, i.e., ethoxylated and/or propoxylated polydiorganic siloxanes (polydialkyl siloxanes, polyalkyl phenyl siloxanes, and the like) and/or the essentially straight-chain and saturated aliphatic, tertiary amines having an aliphatic residue having 10 to 20 carbon atoms, which are substituted with ω-hydroxy-($C_1$-$C_4$)-alkyl groups, N, N-bis-(2-hydroxyethyl)-alkyl amines having 10 to 20 carbon atoms, preferably 12 to 18 carbon atoms in the alkyl residue being especially suitable. The effective quantity of antistatic agent is in the range from 0.05 to 0.5 weight-percent.

Lubricants are higher aliphatic acid amides, higher aliphatic acid esters, waxes, and metal soaps, as well as polydimethyl siloxanes. The effective quantity of lubricant is in the range from 0.01 to 3 weight-percent, preferably 0.02 to 1 weight-percent. The addition of higher aliphatic acid amides in the range from 0.01 to 0.25 weight-percent to the base layer is especially suitable. Particularly suitable aliphatic acid amides are erucic acid amide and stearyl amide. The addition of polydimethyl siloxanes in the range from 0.02 to 2.0 weight-percent is preferred, particularly polydimethyl siloxanes having a viscosity from 5,000 to 1,000,000 $mm^2$/second.

The typical stabilizing compounds for ethylene, propylene, and other α-olefin polymers may be used as stabilizers. The quantity added is between 0.05 and 2 weight-percent. Phenolic and phosphitic stabilizers are especially suitable. Phenolic stabilizers having a molecular mass of more than 500 g/mol are preferred, particularly pentaerythrityl-tetrakis-3-(3,5-di-tertiary butyl-4-hydroxyphenyl)-propionate or 1,3,5-trimethyl-2,4,6-tris(3,5-di-tertiary butyl-4-hydroxybenzyl) benzene. In this case, phenolic stabilizers are used alone in a quantity from 0.1 to 0.6 weight-percent, particularly 0.1 to 0.3 weight-percent, phenolic and phosphitic stabilizers are used in the ratio 1:4 to 2:1 and in a total quantity of 0.1 to 0.4 weight-percent, particularly 0.1 to 0.25 weight-percent.

Neutralization agents are preferably dihydrotalcite, calcium stearate, and/or calcium carbonate of an average particle size of at most 0.7 μm, an absolute particle size of less than 10 μm, and a specific surface area of at least 40 $m^2$/g.

The total thickness of the film according to the present invention may vary within wide limits and depends on the intended use. It is typically 4 to 100 μm, particularly 5 to 80 μm, preferably 6 to 60 μm.

In one possible embodiment, the surface(s) of the layer(s) C or of the additional surface layer(s) is/are corona, plasma, or flame treated. This treatment elevates the adhesion to printing inks, adhesives, cold-sealing layers, metal layers, etc., in a way known per se.

In the following, the individual method steps of the method according to the present invention will be described in greater detail:

In the scope of this method, in principle, the melts corresponding to the individual layers of the film are coextruded through a sheet die, the film thus obtained is drawn off on one or more rollers for solidification, the film is subsequently stretched (oriented), and the stretched film is fixed and possibly plasma, corona, or flame treated on the surface layer provided for treatment. The biaxial stretching (orientation) is performed sequentially, the stretching first being performed longitudinally (in the machine direction) and then transversely (perpendicular to the machine direction).

As is typical in the extrusion method, the polymer and/or the polymer mixture of the individual layers is compressed in an extruder and liquefied, the additives possibly added already able to be contained in the polymer and/or in the polymer mixture. The melts of the different layers are laid one on top of another and combined as melt flows according to the related art and then pressed jointly and simultaneously through a sheet die. The individual layers may be combined in different regions of the die, so that from a chronological viewpoint, the melts are laid one on top of another at different instants.

According to the related art, multilayer films are typically extruded according to the free edge principle, i.e., the width of the surface layers is reduced in relation to the width of the base layer, due to which the two edge regions of the film web remain free of surface layer material. According to the free edge method, the support tenter hooks of the tenter frame engage the film at this free edge and thus transmit the stretching forces directly to the central base layer of a film. The method according to the present invention is very advantageous in relation to this related art.

It is essential for the method according to the present invention that the layer C, in contrast to the typical free edge method described, is extruded having the same width, and/or approximately the same width, as the adhesive layers B and the EVOH layer A lying underneath. This is essential so that the tenter hooks may engage the layers C and the adhesion promoter layers B and the EVOH layer simultaneously during the transverse stretching. It has been shown that the simultaneous action of the tenter hook forces on the composite A/B/C/B/A allows a significantly more uniform and higher stretching of all layers and the EVOH layer may thus be stretched together with the layer C.

In addition, it has been found that maintaining specific extrusion conditions is especially advantageous. It has been found that the adhesion of the individual layers to one another, particularly the adhesion of the EVOH layer to the adhesive layer C, is a function of the dwell time of the melts laid one on top of another. It contributes to good adhesion if the individual layers of the film, which have already been laid one on top of another, dwell for a specific period of time in the molten state laid one on top of another before exiting the die, so that an intensive bonding between the individual layers is achieved.

Therefore, in a further embodiment, it is especially advantageous for the method according to the present invention to ensure a dwell time of the molten layers, particularly a dwell time of the melts of the adhesion promoting layers on the EVOH melt, of at least 6 seconds in the die. The longer this dwell time of the layers laid one on top of another, particularly the adhesion promoting melts on the EVOH melt, is extended in the die, the better the adhesion of the layers. This dwell time is preferably 8 to 180 seconds, particularly 8 to 100 seconds. It has been observed that in the event of too short dwell times of the molten layers, particularly the adhesion promoting layers on the EVOH layer, in the die, delaminations may occur more easily during the subsequent biaxial orientation of the coextruded composite, in particular, sufficient adhesive strength is no longer provided during transverse stretching under certain circumstances. The lack of adhesion results in the ethylene-vinyl-alcohol (EVOH) layer not being oriented, due to which cracks arise in the layer, which may be perceived macroscopically as massive visual defects. The films also have no barrier to oxygen.

The dwell time of the melts in the die may basically be controlled via the die geometry and the extruder output. A die extended in the main flow direction (transversely to the die lip) extends the dwell time. A lower extruder output also extends the dwell time in connection with the appropriately adapted draw-off and running speeds of the draw-off rollers.

Of course, it is necessary to heat the die as usual, so that the melts laid one on top of another are kept at the required temperature. The die temperature is typically 200 to 300° C., preferably 210-250° C.

The multilayer melt guided in this way is shaped into a flat film in the die and drawn off on one or more draw-off rollers at a temperature of 10 to 100° C., preferably 10 to 60° C., immediately after exiting the die, so that it cools to a multilayer precursor film and solidifies.

The precursor film thus obtained is then stretched longitudinally and transversely to the extrusion direction. The longitudinal stretching is preferably performed at a temperature of 110 to 165° C., preferably 120 to 160° C., particularly 140 to 160° C., expediently with the aid of two rolls running at different speeds in accordance with the stretching ratio desired. The longitudinal stretching ratios are in the range from 2 to 8, preferably 3 to 6, particularly 4 to 6. Surprisingly, stretching factors of more than 4.5, which are typical when stretching boPP films, may be applied according to the method according to the present invention.

The transverse stretching is preferably performed at a temperature of 130 to 180° C., preferably 140 to 180° C., with the aid of a corresponding tenter frame. As already noted, it is essential in this case that the composite made of the layers A/B/C/B/A is engaged jointly and simultaneously by the tenter hooks of the tenter frame. The transverse stretching ratios are in the range from 3 to 10, preferably 5 to 9.

According to the present invention, high area stretching ratios (longitudinal stretching factor*transverse stretching factor) of greater than 20, preferably 24 to 50, particularly 25 to 40, may be implemented for these composites according to the sequential method.

Typical fixing to reduce shrinkage tendencies follows the stretching of the film if necessary. For this purpose, the film is guided converging through the frame outlet at a controlled temperature. This has nothing to do with the targeted thermal post-treatment for recrystallization, in which the film is first cooled and then heated to an elevated temperature via heated rollers after the transverse stretching. Finally, the film is wound up in a typical way using a winding device.

Thermal post-treatment for recrystallization of the EVOH layer to improve the barrier is not necessary according to the present invention, but may nonetheless be expedient for other reasons. In general, such a thermal post-treatment at elevated temperature is dispensed with.

Preferably, after the biaxial stretching, one or both surfaces of the film is/are plasma, corona, or flame treated according to one of the known methods. The treatment intensity is generally in the range from 35 to 50 mN/m, preferably 37 to 45 mN/m.

For the corona treatment, the film is guided between two conductor elements used as electrodes, such a high voltage being applied between the electrodes, usually alternating voltage (approximately 5 to 20 kV and 5 to 30 kHz), that spray or corona discharges may occur. Through the spray or corona discharge, the air above the film surface is ionized and reacts with the molecules of the film surface, so that polar intercalations arise in the essentially nonpolar polymer matrix.

If no other specifications were made in the description, the following measurement methods were used to characterize the raw materials and the films:

Melt-Flow Index

The melt-flow index was measured according to DIN 53735 at 21.6 N load and 230° C.

Melting Point

DSC measurement, maximum of the melting curve, heating speed 20° C./minute.

Turbidity

The turbidity of the film was measured in accordance with ASTM-D 1003-52.

Gloss

The gloss was determined according to DIN 67530. The reflector value was measured as the optical characteristic for the surface of a film. On the basis of the norms ASTM-D 523-78 and ISO 2813, the angle of incidence is set at 60° or 85°. A light beam is incident at the set angle of incidence on the flat testing surface and is reflected and/or scattered therefrom. The light beams incident on the photoelectronic receiver are displayed as the proportional electrical variable. The measured value is dimensionless and must be specified with the angle of incidence.

Surface Tension

The surface tension was determined via the ink method (DIN 53364).

Water Vapor and Oxygen Permeability

The water vapor permeability was determined in accordance with DIN 53122 part 2. The oxygen barrier effect was determined in accordance with DIN 53380 part 3 at an ambient humidity of approximately 50%.

The present invention will now be described in greater detail on the basis of exemplary embodiments:

EXAMPLE 1

At a die temperature of 240° C., a five-layered film consisting of a base layer C made of ethylene-vinyl-alcohol (EVOH) having adhesion promoting layers B on both sides and polyolefin layers A applied on both sides was coextruded together. In this case, all layers were extruded having the same width (no free edge). Subsequently, the melts were drawn off on a draw-off roller and oriented step-by-step in the longitudinal and transverse directions. The thickness of the layers A was approximately 8 μm each, the thickness of the adhesive layers B was approximately 0.8 μm each, and the thickness of the ethylene-vinyl-alcohol (EVOH) layer C was 5 μm, corresponding to a total film thickness of approximately 23 μm.

Base Layer C:
100 weight-percent EVOH (EVAL ES104B) having 44 mole-percent ethylene content and having a melting point Tm of 156° C. and a melt-flow index of 6.5 g/10 minutes [at 230° C.; 21.6 N]

Adhesion Promoting Layers B:
100 weight-percent polypropylene modified using maleic acid anhydride having a melting point Tm of 160° C. and a melt-flow index of 7 g/10 minutes to 8 g/10 minutes [at 230° C., 21.6 N] (type ADMER QF)

Layers A:
100 weight-percent isotactic propylene homopolymer having a melting point of 162° C. and a crystallinity of 60% and a melt-flow index of 6.0 g/10 minutes The manufacturing conditions in the individual method steps were:

| Extrusion temperatures: | |
| --- | --- |
| base layer C: | 220° C. |
| adhesion promoting layer B: | 190° C. |
| layers A: | 240° C. |
| temperature of the draw-off roller: | 30° C. |
| longitudinal stretching: | |
| temperature: | 155° C. |
| longitudinal stretching ratio: | 4.0-5.0 |
| transverse stretching: | |
| temperature: | 170° C. |
| transverse stretching ratio: | 6.8 |
| fixing: | |
| temperature: | 168° C. |
| convergence: | 10% |

The transverse stretching ratio $\lambda_Q=6.8$ is an effective value. This effective value is calculated from the final film width B, reduced by two times the cutoff edge width b, divided by the width of the longitudinal a stretch film C, also reduced by two times the cutoff edge width b. The oxygen barrier was 17 $cm^3/m^2*day*bar$. The water vapor barrier was 10.7 $g/m^2*d$.

EXAMPLE 2

A film was manufactured as described in Example 1. In contrast to Example 1, 100 weight-percent Soranol AT 4403 was used as the EVOH polymer in the layer C. The EVOH had an ethylene content of 44 mole-percent and a melt-flow index of 3-4 g/10 minutes (210° C. and 2.16 kg) and a melting point of 164° C. A polypropylene Tymor 220 from Morton, modified using maleic acid anhydride, having a melt-flow index of 6 g/10 minutes (230° C., 16 kg) and a melting point of 163° C., was used as the adhesion promoter. The method conditions, as well as the layer thicknesses and extrusion widths of the individual layers, were not altered except for the transverse stretching factor. The transverse stretching was 8.5 in this example. In this way, a film having an oxygen barrier of approximately 5 $cm^3/m^2*day*bar$ was obtained.

EXAMPLE 3

A film was manufactured as described in Example 1. In contrast to Example 1, a different EVOH was used in the central layer. This EVOH had an ethylene content of 32 mole-percent, a melting point of approximately 140° C., and an MFI of 4.5 g/10 minutes. The remaining composition of the layers, the layer thicknesses, and the method conditions according to Example 1 were not changed. The film thus obtained had an oxygen barrier of 10.5 $cm^3/m^2*day*bar$.

COMPARATIVE EXAMPLE 1

A film was manufactured as described in Example 1. In contrast to Example 1, the EVOH layer was extruded approximately 5% wider than the remaining layers, so that in the transverse stretching only the EVOH layer was engaged by the tenter hooks. The film showed strong cracking and optical defects (fisheyes). The oxygen barrier was over 300 $cm^3/m^2*day*bar$. The method was not suitable for stretching the film composite.

The invention claimed is:

1. A method for manufacturing a multilayer biaxially oriented film which comprises at least five layers having the arrangement A/B/C/B/A, the inner layer C being synthesized from an ethylene-vinyl-alcohol copolymer (EVOH layer) and an adhesion promoting layer B made of modified polyolefin being applied on both sides on each surface of the EVOH layer C and a layer A made of a partially crystalline thermoplastic polyolefin being applied to the surfaces of the particular adhesion promoting layers, characterized in that the melts corresponding to the individual layers of the film are coextruded through a sheet die, the multilayer film thus obtained is drawn off on one or more roll(s) for solidification, the film is subsequently stretched in the longitudinal direction and then in the transverse direction using a tenter frame, the EVOH layer C and the adhesion promoting layers B and the layer A are coextruded at the same width, and the tenter hooks of the frame engage all five layers jointly and simultaneously during the transverse stretching and wherein the EVOH layer has a thickness of at most 10 μm.

2. The method according to claim 1, characterized in that the modified polyolefin of the layers B is a polypropylene or polyethylene modified using maleic acid anhydride.

3. The method according to claim 2, characterized in that the polypropylene modified using maleic acid anhydride has a melt-flow index of 1 to 10 g/10 minutes and a softening point between 110 and 155° C.

4. The method according to claim 1, characterized in that the adhesion promoting layers each have a thickness of 0.4 to 4 μm.

5. The method according to claim 1, characterized in that the EVOH copolymer has an ethylene content of 30-60 mole-percent ethylene and a melting point in the range from 140-190° C.

6. The method according to claim 5, characterized in that the EVOH copolymer has a melt-flow index of 1-7 g/10 minutes.

7. The method according to claim 1, characterized in that the polyolefin of the layers A has a melting point of 150-170° C.

8. The method according to claim 7, characterized in that the polyolefin of the layers A is an isotactic propylene homopolymer having a melting point of 155-165° C.

9. The method according to claim 1, characterized in that at least one of the two layers A contains vacuole-initiating fillers and/or pigments in addition to the partially crystalline polyolefin and is opaque.

10. The method according to claim 1, characterized in that the layers A are each 5 to 15 μm thick.

11. The method according to claim 1, characterized in that a surface layer is applied to at least one surface of the layers A and this/these surface layer(s) is/are sealable.

12. The method according to claim 1, characterized in that the melts corresponding to the adhesion promoting layers and the melt corresponding to the EVOH layer lie one on top of another in the molten state for a duration of at least 6 seconds before exiting the die.

13. The method according to claim 1, characterized in that the orientation in the longitudinal direction is performed using a longitudinal stretching ratio of 3:1 to 8:1 and the orientation in the transverse direction is performed using a transverse stretching ratio of 3:1 to 10:1.

14. A method for manufacturing a multilayer biaxially oriented film which comprises at least five layers having the arrangement A/B/C/B/A, the inner layer C being synthesized from an ethylene-vinyl-alcohol copolymer (EVOH layer) and an adhesion promoting layer B made of modified polyolefin being applied on both sides on each surface of the EVOH layer C and a layer A made of a partially crystalline thermoplastic polyolefin being applied to the surfaces of the particular adhesion promoting layers, characterized in that the melts corresponding to the individual layers of the film are coextruded through a sheet die, the multilayer film thus obtained is drawn off on one or more roll(s) for solidification, the film is subsequently stretched in the longitudinal direction and then in the transverse direction using a tenter frame, the EVOH layer C and the adhesion promoting layers B and the layer A are coextruded at the same width, and the tenter hooks of the frame engage all five layers jointly and simultaneously during the transverse stretching and wherein the EVOH copolymer has a melt-flow index of 1-7 g/10 minutes.

15. A method for manufacturing a multilayer biaxially oriented film which comprises at least five layers having the arrangement A/B/C/B/A, the inner layer C being synthesized from an ethylene-vinyl-alcohol copolymer (EVOH layer) and an adhesion promoting layer B made of modified polyolefin being applied on both sides on each surface of the EVOH layer C and a layer A made of a partially crystalline thermoplastic polyolefin being applied to the surfaces of the particular adhesion promoting layers, characterized in that the melts corresponding to the individual layers of the film are coextruded through a sheet die, the multilayer film thus obtained is drawn off on one or more roll(s) for solidification, the film is subsequently stretched in the longitudinal direction and then in the transverse direction using a tenter frame, the EVOH layer C and the adhesion promoting layers B and the layer A are coextruded at the same width, and the tenter hooks of the frame engage all five layers jointly and simultaneously during the transverse stretching and wherein the polyolefin of the layers A has a melting point of 150-170° C.

* * * * *